US006965094B1

(12) United States Patent
    Friedman (10) Patent No.: US 6,965,094 B1
(45) Date of Patent: Nov. 15, 2005

(54) CONTROLLED HEAT STEAMER

(76) Inventor: Nitai Friedman, 55 Heath Place, Hampstead, Quebec (CA)

( * ) Notice: Subject to any disclaimer, the term of this patent is extended or adjusted under 35 U.S.C. 154(b) by 0 days.

(21) Appl. No.: 10/998,614

(22) Filed: Nov. 30, 2004

(51) Int. Cl.[7] ............................ A21B 1/24; F27D 19/00
(52) U.S. Cl. ..................... 219/401; 219/494; 126/20
(58) Field of Search .......................... 219/401, 494; 126/20, 20.1, 20.2; 99/467, 468

(56) References Cited

U.S. PATENT DOCUMENTS

| | | | | |
|---|---|---|---|---|
| 3,077,530 | A | * | 2/1963 | Chase et al. ............... 219/401 |
| 3,604,895 | A | * | 9/1971 | MacKay .................... 219/401 |
| 4,509,412 | A | | 4/1985 | Whittenburg et al. ........ 47/331 |
| 5,025,132 | A | * | 6/1991 | Fortmann et al. ........... 219/401 |
| 6,267,046 | B1 | | 7/2001 | Wanat ........................ 23/332 |
| 6,294,765 | B1 | * | 9/2001 | Brenn ....................... 219/494 |
| 6,323,464 | B1 | | 11/2001 | Cohn ......................... 21/401 |
| 6,453,802 | B1 | | 9/2002 | Manganiello et al. ........ 23/330 |
| 6,486,446 | B1 | | 11/2002 | Kao ........................... 22/438 |
| 6,564,699 | B1 | * | 5/2003 | Vincente et al. ............. 99/468 |

FOREIGN PATENT DOCUMENTS

JP    59-221526 A  * 12/1984

* cited by examiner

Primary Examiner—Joseph Pelham
(74) Attorney, Agent, or Firm—Donald C. Casey (57) ABSTRACT

An automatically operated steamer for cooking and warming food products is described. The steamer uses three operating thermostatic controls, a housing with a reservoir in the bottom thereof, and an electrical heat source disposed below said reservoir to heat the same. When cold water is admitted to the reservoir a thermostat closes to generate heat to warm the water and as the water warms, the flow of the water into the reservoir ceases. When the reservoir water reaches a temperature slightly above its boiling point, a second thermostat operates to control the temperature to keep the water boiling until it completely evaporates. When the water evaporates the heat within the device steamer increases, and another thermostat opens at a predetermined elevated temperature to signal for the addition of water to the reservoir. Still another thermostat operates to control the heat generated within said reservoir and steamer at a predetermined level to maintain a heated condition for food being cooked or held, and yet another safety thermostat opens in response to a predetermined elevated temperature to de-energize the electrical heater below the reservoir.

11 Claims, 8 Drawing Sheets

CONTROLLED HEAT STEAMER

FIELD OF THE INVENTION

This invention relates to an electric steamer and in particular to a steamer for cooking food wherein the application of heat through the cooking cycle is virtually automatic and involves only minimal operation action in order to cook food completely.

DESCRIPTION OF THE PRIOR ART

Steamers have been known for many years, and in particularly, steamers which operate at slightly above atmospheric pressure or the steam at the boiling point of water of slightly higher. This is in contrast to cookers which operate at an elevated pressure. In a commercial environment it is desirable to avoid safety hazards relative to steam cooking at highly elevated pressures.

In addition, in a commercial oven, it is likely that the operator will be unskilled, or only minimally skilled and therefore it is desirable for ease of operation and to avoid accidents keeping operator contact with the steamer to a minimum.

In U.S. Pat. No. 6,486,446 a steamer is described wherein a pan is provided with an aluminum alloy plate and an electric heating element is welded to the bottom of the plate. A thermostatic circuit is also provided for keeping the pan at a constant temperature when energized. A switch is provided for switching between the thermostatic temperature control circuit, and the electric heating member. The electric heating member is turned on when the switch is manually activated and is turned off and the thermostatic circuit energized when food being cooked reaches a predetermined temperature. During the cooking procedure, the electric heating member is manually activated, and at a predetermined temperature, the electric heating member is switched off and the thermostatic circuit energized to maintain a predetermined temperature in the cooking pan.

This cooker however does not use steam but rather operates at atmospheric pressure, and uses dry heat from the electric heating member. Therefore, the need to regulate steam and water consumption is not a part of this invention.

U.S. Pat. No. 6,453,802 does describe a steam cooking apparatus. In this patent, an insulated cooker housing is provided with portions of side walls holding a supply of water and a heater in the form of a cast metal with electric heating elements embedded therein is provided on the floor of the housing in a water well. The heater then generates steam from the water which fills the housing of the cooker. This patent describes a structure for elluminating cold air which may be trapped in the cooker when steam is generated.

In this patent there is a pressure sensor which when the internal pressure reaches a pre-selected limit triggers a switch which interrupts the supply of electric power to the heater. When the steam cools below a pre-selected limit the switch closes to supply power again. A second switch is provided which acts as a safety pressure release to open a valve to release steam from an outlet to the atmosphere.

Structurally, a pair of branched conduits are provided and a thermostat and solenoid valve are located at a outlet from the cooker.

The heating element however is described as tilted, and equipped with heat sensors mounted thereon. When the sensor detects the temperature rise to 310 degrees F. it automatically resets. If the lower sensor detects temperature rise to 378 degrees F. it must signal a low water condition turning off the power and must be manually reset.

This patent describes an automatic electric steam trap connected to the steam outlet which is normally opened to the atmosphere and closes in response to an elevated temperature.

This patent then describes a number of heating elements and temperature sensors together with micro switches and the two form a relatively complicated control system requiring manual intervention.

In U.S. Pat. No. 6,323,464 there is described a proofing chamber or holding chamber wherein pieces of dough are subjected to hot, humid air, or food is maintained in a hot, moist state. While steam is generated, the main purpose is to provide hot, humid air within the proofing or holding chamber. The stream of hot, humid air is provided by injecting steam generated into a stream of relatively cold air.

U.S. Pat. Nos. 6,267,046 and 4,509,412 also describe food steaming devices which are relatively complicated for generating the steam in a cooking environment.

Accordingly there remains a need for a steam cooker with very substantially automated controls in a compact environment wherein the operator has only minimal involvement with the operation of the device. It is further necessary to provide for efficient operation a design to cook food, and then hold the food at an elevated temperature so that it does not cool before being served.

SUMMARY OF THE INVENTION

It has been discovered that a steamer can be constructed which requires only a minimal intervention by the operator whereas the steamer functions are automatic and controlled by thermostatic switches. The steamer of this invention consists of a housing having an upper sliding lid which can be retracted for the additional food to be cooked. The food is contained within a perforated basket. A heat spreading plate is located below the basket and electric heating coils are disposed against the lower surface of the heat spreading plate.

Operation of the device of this invention is controlled by three thermostatic switches, namely, a normally closed high differential thermostatic switch, a boil control thermostatic switch, and a hold/warm thermostatic switch. A water reservoir is provided between the bottom surface of the perforated basket, and the heat spreading plate, and an add water warning light is also provided external to the housing to signal an operator when it is time to add water. An external switch to switch the unit between a cooking mode, a hold mode, and off is provided. Finally, a safety switch is provided to interrupt the flow of electricity to the heating coil if the temperature exceeds an operating maximum. An operator is only used to add water when the warning light is lit, and to switch the external switch between modes of operation if necessary.

In a preferred embodiment of this invention the high differential (water-out) thermostat is normally closed and opens on a temperature rise in the range of 240 degrees F., and closes at a temperature of about 140 degrees F. The boil control thermostat opens and closes on a temperature rise between temperatures close to but slightly above the boiling point of water. The hold/warm thermostat opens with a temperature rise, and open and close temperatures are in the range of 170 degrees F. The safety override switch operates at a temperature of about 260 degrees F. The device of this invention operates as follows: starting from room temperature, cold water conditions, current flows through the normally closed high differential thermostat through the normally closed boil control thermostat, and through the heating elements. The boil control thermostat regulates the temperature, and the condition of the warm/hold thermostat is irrelevant at this point in operation. The normal steam mode of operation is sustained until water in the reservoir is completely evaporated. When the water is evaporated, the high differential water-out thermostat senses an overshoot of temperature on the heat spreading plate and the thermostat opens. When this thermostat opens the state of the boil control thermostat becomes irrelevant and the add water light illuminates. Current flows through the warm/hold thermostat and through the heating element with the warm/hold thermostat regulating the temperature so that food can be continuously warmed during the add water mode of operation.

The high differential water-out thermostat does not close until the temperature of the heat spreader plate drops significantly below the control temperatures of the other thermostats. When cold water is re-introduced to the reservoir it causes all thermostats to close returning the apparatus to the normal steam mode and the operational cycle is then repeated.

The device of this invention then functions substantially automatically with the exception of the add water feature which requires the intervention of an operator. The device of this invention then can function with substantially untrained or minimally train ed operators to cook food, and to retain heat in the food during the add water phase of operation.

Accordingly it is an object of this invention to provide a simple, substantially automatic steamer for cooking food.

It is another object of this invention to provide a thermostatically controlled steamer wherein thermostats operate within pre-selected ranges of temperature to steam cook food, hold the food in a warm environment when water is added to the steamer and to return the steamer to a normal steam cooking operation, automatically, when water is reintroduced to the steamer.

It is still another object of this invention to provide a method for steam cooking food which is substantially automatic between modes of steam cooking, the addition of water and the return of the device to the steam cooking mode.

These and other objects will become readily apparent with reference to the drawings and following description wherein:

DETAILED DESCRIPTION OF THE INVENTION

Figure 1:
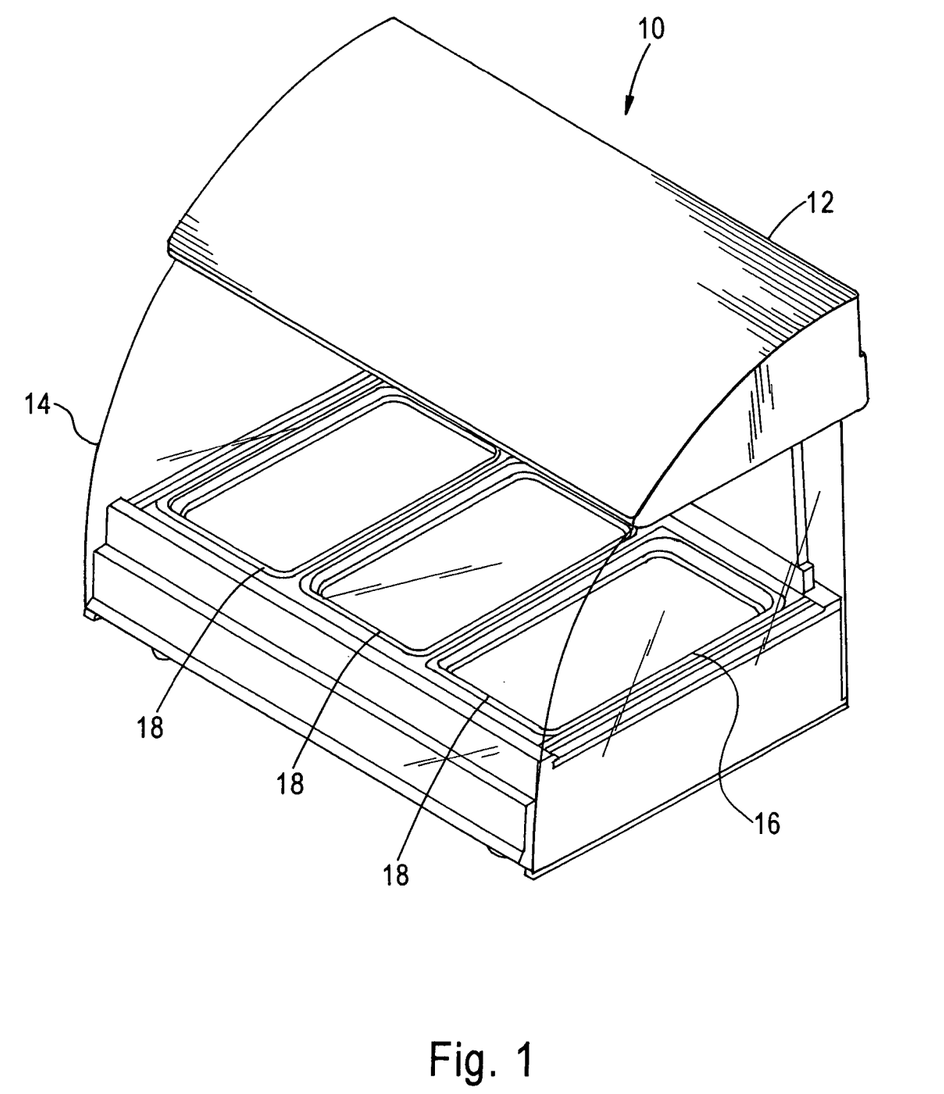
FIG. 1 is a perspective view of a preferred embodiment of this invention showing a closed lid and three food retaining, perforated pans.
Figure 2:
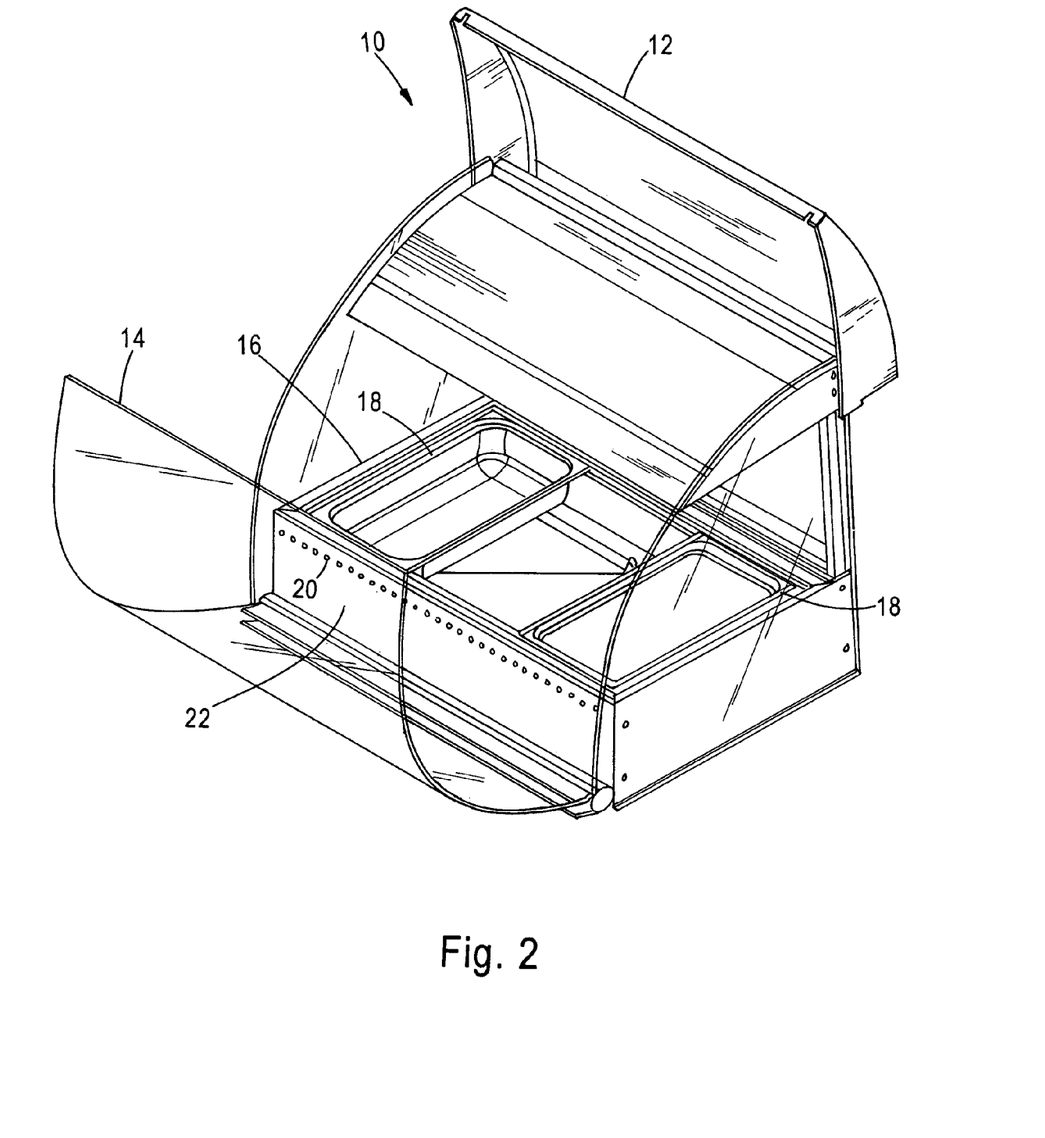
FIG. 2 is a perspective view of the device of FIG. 1 showing an open lid configuration.

With attention to FIGS. 1 and 2 the steamer of this invention 10 includes an upper pivotal lid 12 and a front pivotal lid 14. FIG. 1 shows the lids 12 and 14 in a closed position and FIG. 2 shows the lids in an open position exposing perforated tray 16 which holds food for cooking or maintaining in a heated condition before serving. In the embodiment of FIGS. 1 and 2, the perforated tray 16 consists of three food-containing pans 18. As shown in FIG. 2, vents 20 are provided in the housing 22 whereby, as will be subsequently explained, steam from the steamer contained in the housing 22 can be expelled under the lids 12 and 14 when they are in the closed position while the tray 18 with perforations (not shown) allows the upward movement of steam against the bottom of food items (not shown) contained in the pans 18.

Figure 3:
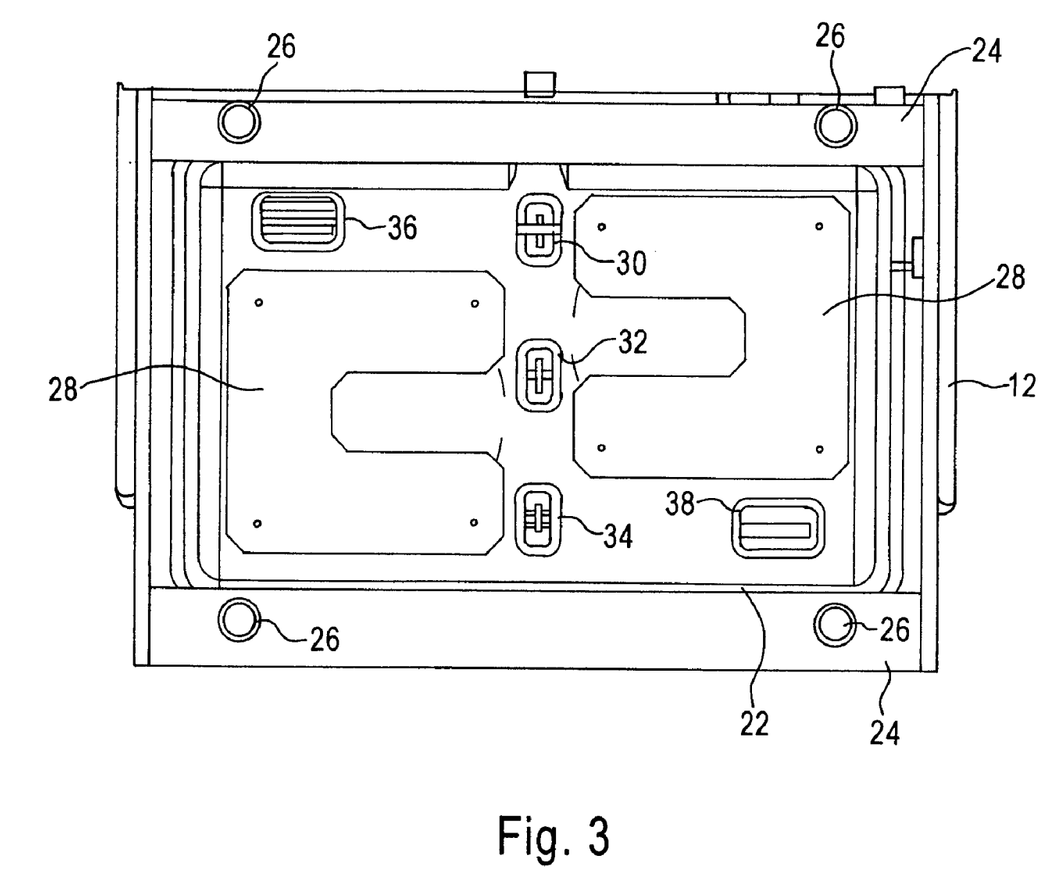
FIG. 3 is a bottom view of the steamer of this invention.

With reference to FIG. 3, the bottom of the housing 22 mounts longitudinal seal members 24 and individual legs 26 so that the housing is spaced above the counter top on which the unit rests. Heat shields 28 are provided to cover a portion of the burner members as will be subsequently explained. Vents 30 and 32 are provided for thermostats as will be subsequently explained also, and a spare position 34 is provided. A vent 36 also for a thermostat is provided as well as a spare vent 38. Finally, a cover plate (not shown) is disposed over the entire bottom portion shown in FIG. 3, and this plate has been removed for clarity.

Figure 4:
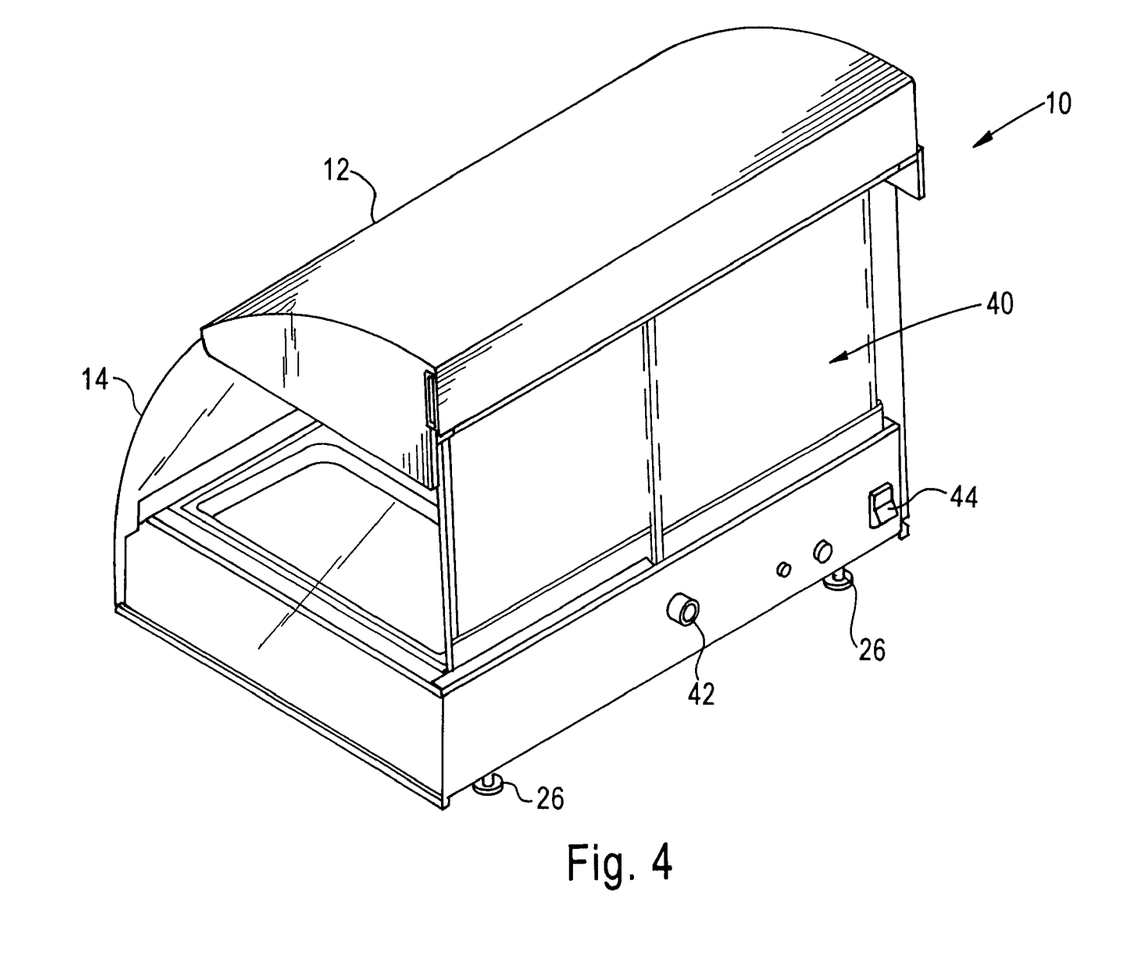
FIG. 4 is a rear view of the embodiment of FIGS. 1 and 2.

FIG. 4 is a rear view of the device 10 of this invention showing a back portion of 40, a drain 42 and an on/off switch 44.

Figure 5:
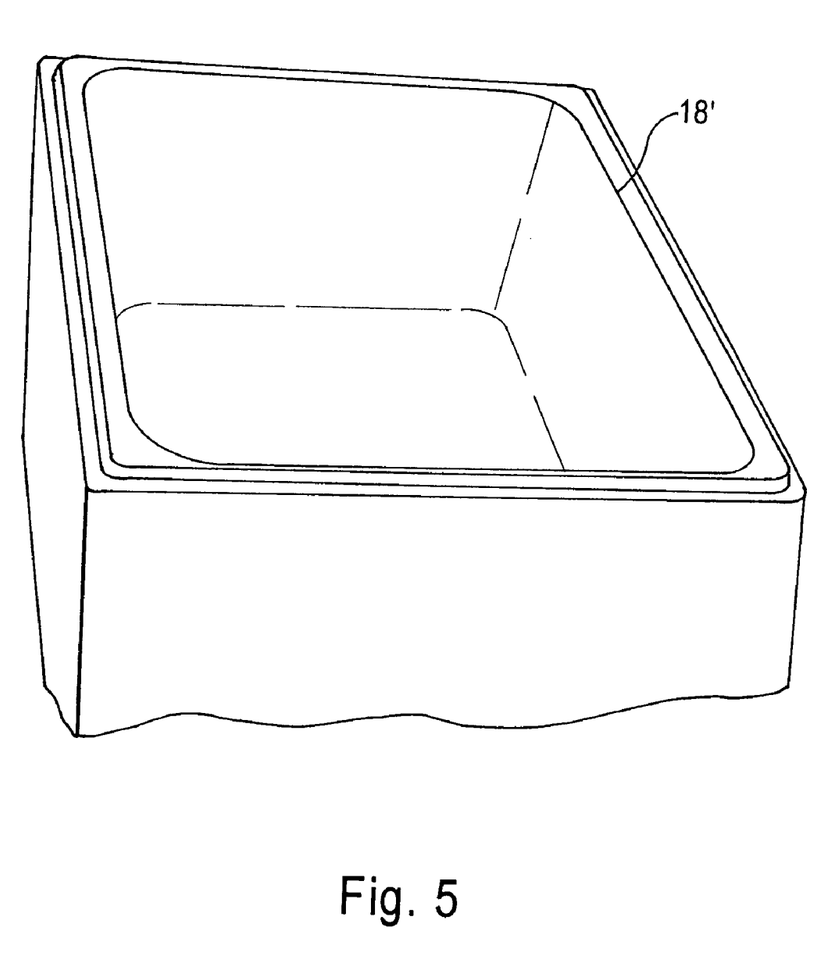
FIG. 5 is a perspective fragmentary view of the bottom portion of the device of this invention showing a single perforated pan for retaining food according to this invention.

FIG. 5 is a fragmentary view showing an alternate embodiment wherein the perforated pan is a single pan 18' instead of the three pans 18 shown for example in FIGS. 1 and 2.

Figure 6:
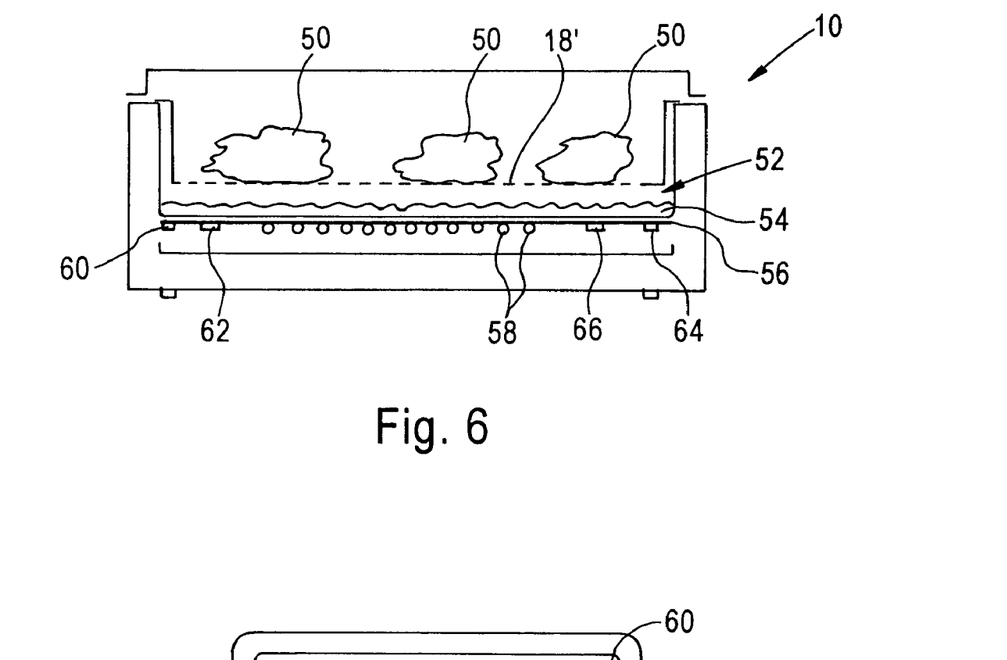
FIG. 6 is a front cutaway schematic view of the device of this invention.

With attention to FIG. 6, there is depicted a schematic representation of the device 10 of this invention. In the embodiment of FIG. 6, a perforated pan 18' is provided along with items of food to be cooked 50. A water-containing reservoir 52 is provided below the food to be cooked 50 and along the sides thereof wherein water 54 is provided. Beneath the reservoir 52 is a heat spreading plate 56 which is heated by conventional heating elements 58. A safety thermostatic switch 60 is provided remote from the heating elements 58 and in contact with the heat spreading plate 56. A first thermostatic switch 62 and the second thermostatic switch 64 are provided separated from the heating elements 58. Thermostatic switches 62 and 64 may be the boil control thermostat and the hold/warm thermostat, and these positions shown can be reversed.

Thermostatic switch 66 is the high differential (water-out) thermostat and it is disposed relatively close to the heating elements so that in the case of a lack of water in the reservoir 52 it will be the first to sense a rapid temperature rise and an overshoot of the heat spreading plate.

Figure 7:
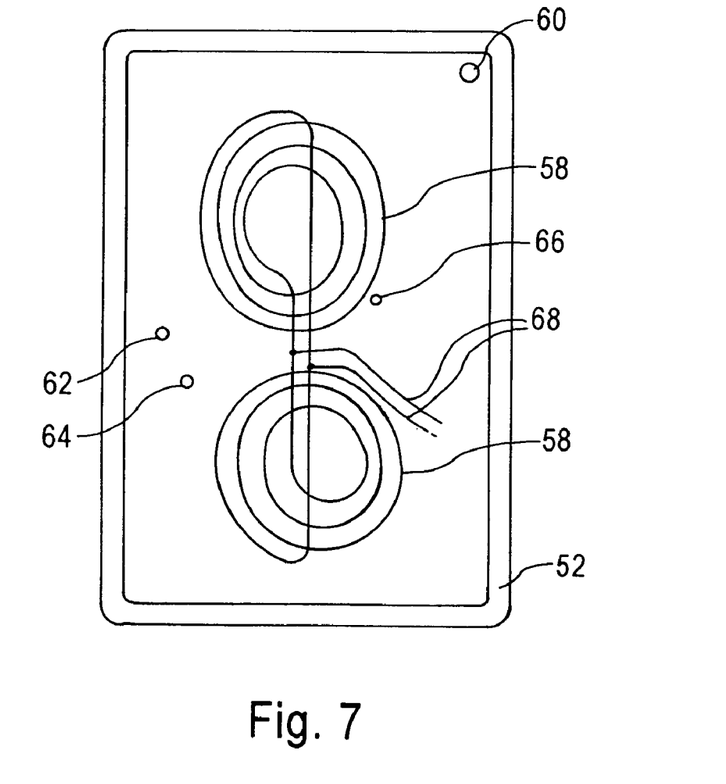
FIG. 7 is a schematic bottom view of the device of this invention with the bottom portion of the housing removed.

With reference to FIG. 7, a schematic bottom view of the device FIG. 6 the heating elements 58 are conventional resistance coils with an input electrical line 68 provided. The thermostats 60, 62, 64 and 66 are also shown.

Figure 8:
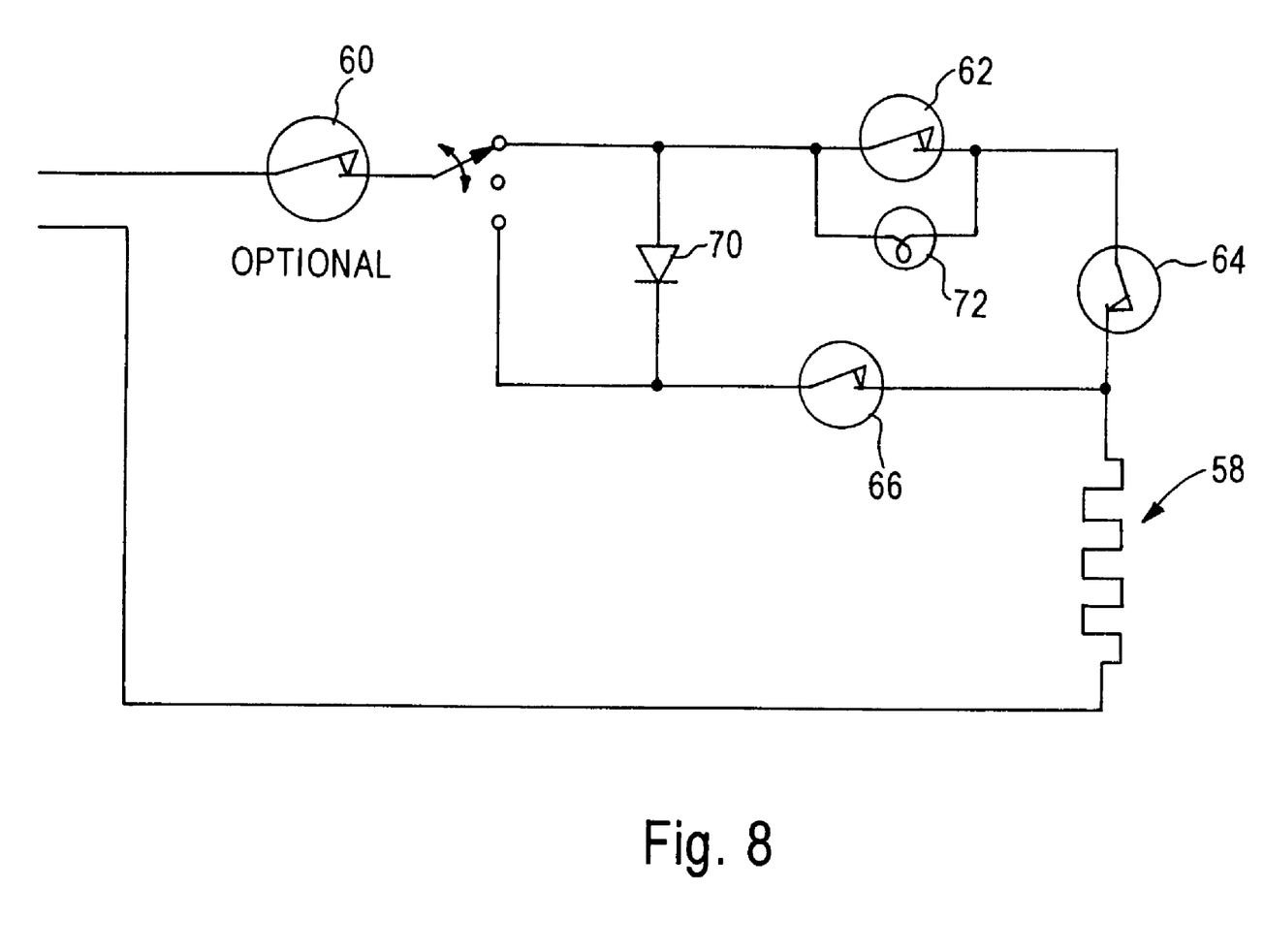
FIG. 8 is an electric schematic view of the device of this invention.

With reference to the wiring diagram shown in FIG. 8, reference number 60 is the safety thermostat which when it is tripped, the flow of electricity to the system is terminated.

Reference number 70 is a diode, and reference number 72 is the add water light which functions in conjunction with the high differential (water-out) thermostat 62. The boil control thermostat 64 and the hold/warm thermostat 66 act relative to the heating elements 58 as will be subsequently described.

Figure 9:
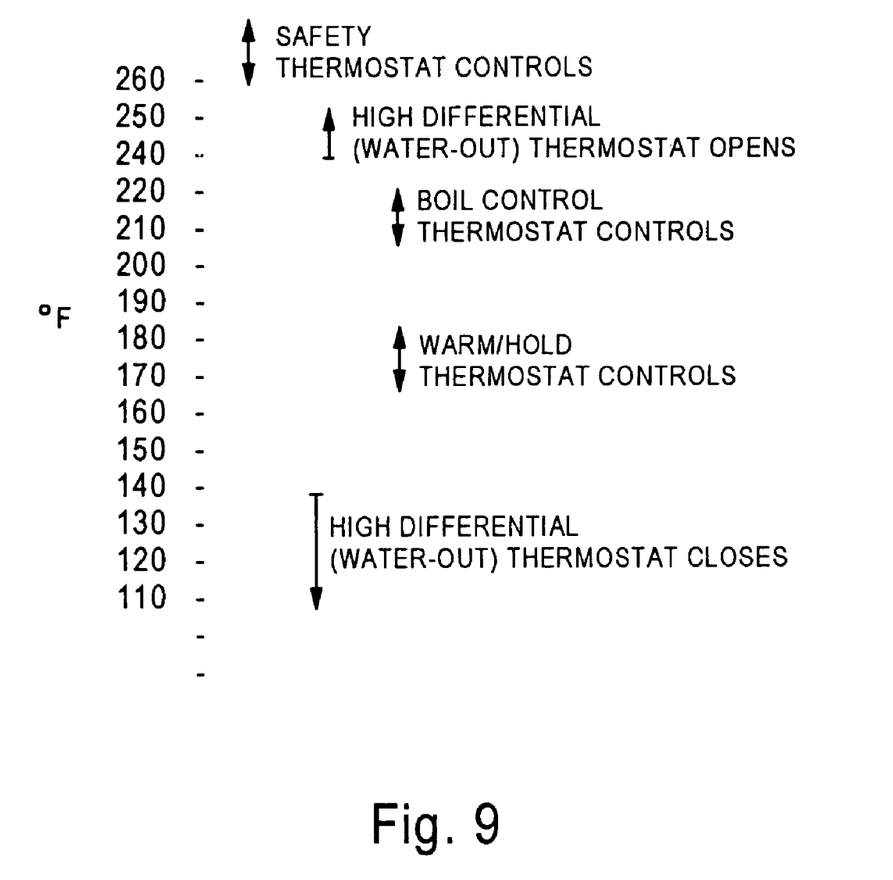
FIG. 9 is a flow chart showing temperatures of the preferred embodiment and thermostatic ranges including an optional safety over ride.

With reference to the flow chart shown in FIG. 9, the safety thermostat triggers at a temperature of about 260 degrees F. as registered from the heat spreading plate 56. This would obviously reflect a no water situation in the reservoir 52. The high differential (water-out) thermostat 62 opens at a temperature slightly below the safety thermostat so that it functions in the range of about 240 to 250 degrees F. The boil control thermostat 64 operates slightly above the boiling point of water, at around 210 to 220 degrees F., and during normal steaming operation this thermostat will keep the water 54 in the reservoir 52 at this temperature range to generate steam for the purpose of cooking the food 50.

The warm/hold thermostat 66 functions in the heating range of around 170 to around 190 degrees F. and this is intended to keep food 50 warm either during the water filling mode for reservoir 52, or subsequent to cooking before serving the food.

Finally, the high differential (water-out) thermostat 62 closes at about 140 degrees F.

The operation of the device of this invention is described as follows:

Starting from room temperature conditions cold water flows into the reservoir 56 and the presence of the cold water is registered on the normally closed high differential thermostat 62 which remains closed. When the water in reservoir 52 reaches boiling, the boil control thermostat 64 operates to control the temperature of the boiling water at about 210 to 220 degrees F. normally slightly over the boiling temperature of water. At this point the warm/hold thermostat 66 is not involved. This is the normal steam mode of operation of the apparatus which is sustained until the water in reservoir 52 boils away. When this occurs the high differential thermostat 62 registers the increase in temperature of the heat spreading plate 56 and this thermostat will open. When the high differential thermostat 62 opens, the boil control thermostat 64 is no longer relevant and the add water light 72 is illuminated. The current then flows through the diode 70 through the warm/hold thermostat 66 and the heating elements 58. The warm/hold thermostat 66 regulates the temperature using half-wave rectified current.

This is the "add water" mode of operation that gently maintains warmth in the unit 10 to prevent products from becoming cold during this operation. The high differential thermostat 62 will not close until the temperature of the heat spreader plate 56 drops significantly below the control points of the other thermostats. When cold water is reintroduced into the reservoir 52 it will cause all thermostats to close returning the apparatus to the normal steam mode.

The operator then only functions to activate or deactivate the on/off switch 44, and to add water through the drain 42 to the reservoir 52.

It will be readily seen by one of ordinary skill in the art that the present invention fulfills all of the objects set forth above. After reading the foregoing specifications, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. A steamer for cooking and warming food comprising:
   an upwardly opening housing having a door across the upper portion thereof;
   electrical heat means mounted in the bottom portion of said housing for heating the interior of said housing;
   a heat spreading plate disposed above said heat means in thermal contact therewith and abutting the interior sides of said housing in sealing relation therewith;
   a reservoir means disposed above said plate in thermal contact therewith for holding water to be boiled by heat conducted from said plate into said reservoir;
   first thermostat means carried by said plate and switch controlled thereby for closing when cold water is admitted to said reservoir;
   said first thermostat means further including means for opening responsive to a temperature of said plate above a predetermined maximum until water is admitted to fill said reservoir;
   second thermostat means carried by said plate and switch controlled thereby for energizing and de-energizing said heat means to heat cold water to above its boiling point and maintain said water at a boil until it has evaporated and first thermostat opens;
   third thermostat means carried by said plate and coupled to said heat means for opening to maintain said plate at a predetermined temperature when said first thermostat means opens.

2. The steamer of claim 1 further comprising a fourth thermostat means and switch therefor carried by said plate for opening to de-energize said heat means when said plate reaches a predetermined temperature above said predetermined maximum.

3. The steamer of claim 1 further comprising means for opening to deactivate said second thermostat means when said third thermostat means is activated.

4. The steamer of claim 1 further comprising control means for deactivating said third thermostat means when said second thermostat means is activated.

5. The steamer of claim 1 wherein said second thermostat means when activated maintains said water at a temperature of about between about 210 and 220 degrees F.

6. The steamer of claim 1 wherein first thermostat means opens responsive to a temperature of about 240 to 250 degrees F.

7. The steamer of claim 6 wherein said first thermostat means closes responsive to a temperature of less than about 140 degrees F.

8. The steamer of claim 7 wherein when cold water is admitted to said reservoir said first, second and third thermostat means all close.

9. The steamer of claim 8 wherein said first thermostat means closes when water is admitted to said reservoir, and opens when water has evaporated therefrom.

10. The steamer of claim 2 wherein said fourth thermostat means opens at a temperature of about 260 degrees F.

11. The steamer of claim 10 wherein said first, second, third and fourth thermostat means open and close automatically in sequence.

* * * * *